United States Patent
Ko et al.

(10) Patent No.: US 8,081,170 B2
(45) Date of Patent: Dec. 20, 2011

(54) OBJECT-SELECTING METHOD USING A TOUCHPAD OF AN ELECTRONIC APPARATUS

(75) Inventors: Chueh-Pin Ko, Taipei Hsien (TW); Jiann-Jou Chen, Taipei Hsien (TW)

(73) Assignee: Acer Incorporated, Taipei Shien (TW)

( * ) Notice: Subject to any disclaimer, the term of this patent is extended or adjusted under 35 U.S.C. 154(b) by 589 days.

(21) Appl. No.: 12/338,325

(22) Filed: Dec. 18, 2008

(65) Prior Publication Data

US 2009/0231291 A1    Sep. 17, 2009

(30) Foreign Application Priority Data

Mar. 17, 2008    (TW) ................................ 97109312 A (51) Int. Cl.
*G06F 3/041*    (2006.01)

(52) U.S. Cl. ........................................................ 345/173
(58) Field of Classification Search .................. 345/173, 345/156, 157
See application file for complete search history.

(56) References Cited

U.S. PATENT DOCUMENTS

| | | | |
|---|---|---|---|
| 2009/0066474 A1* | 3/2009 | Kawachi et al. | 340/3.1 |
| 2009/0262086 A1* | 10/2009 | Chen | 345/173 |

* cited by examiner

*Primary Examiner* — Fred Tzeng
(74) *Attorney, Agent, or Firm* — McNees Wallace & Nurick LLC (57) ABSTRACT

An object-selecting method includes detecting presence of a touch spot on a touchpad of an electronic apparatus, determining a set of objects adjacent to a position associated with the touch spot detected in step A), and selecting one of the objects when it is determined that the position of the touch spot moves toward the selected object.

11 Claims, 9 Drawing Sheets

OBJECT-SELECTING METHOD USING A TOUCHPAD OF AN ELECTRONIC APPARATUS

CROSS-REFERENCE TO RELATED APPLICATION

This application claims priority of Taiwanese application no. 097109312, filed on Mar. 17, 2008.

BACKGROUND OF THE INVENTION

1. Field of the Invention

This invention relates to an object-selecting method for selecting an object, such as a computer icon displayed on a screen of an electronic apparatus, using a touchpad of the electronic apparatus.

2. Description of the Related Art

Many users prefer selection of an object, such as a computer icon, displayed on a touchscreen of an electronic apparatus by a finger, rather than by a stylus, to save the time and effort required for retrieving and handling the stylus. However, selection of an object by a finger is slow and error prone. Two object-selecting techniques have been proposed heretofore to address these issues.

Figure 1:
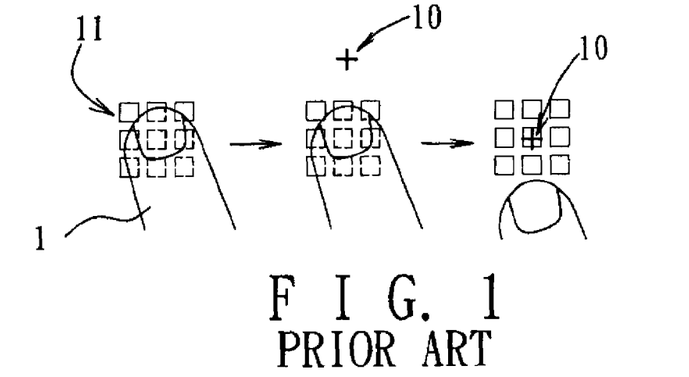
FIG. 1 is a schematic diagram illustrating a conventional object-selecting technique.

In the first object-selecting technique, as illustrated in FIG. 1, when a tip of a user's finger 1 is detected on a touchscreen (not shown), and when the tip of the user's finger 1 overlaps more than one object 11 displayed on the touchscreen, a cursor extension 10 is shown on the touchscreen, which thereafter may be moved to select one of the objects 11.

Figure 2:
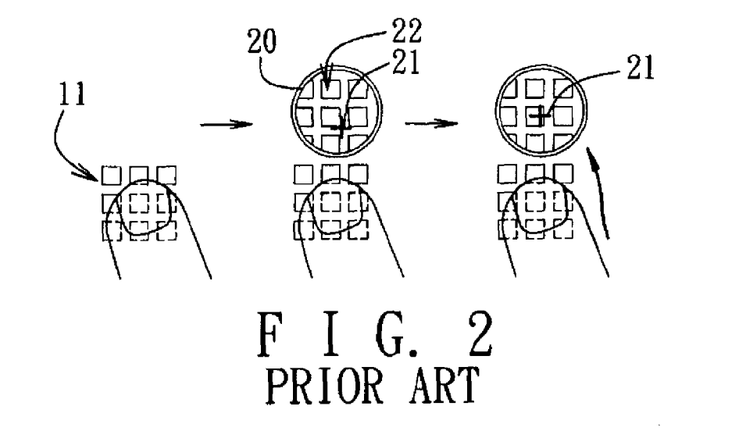
FIG. 2 is a schematic diagram illustrating another conventional object-selecting technique.

In the second object-selecting technique, called Shift, as illustrated in FIG. 2, when a tip of a user's finger 1 is detected on a touchscreen (not shown), and when the tip of the user's finger 1 overlaps more than one object 11 displayed on the touchscreen, a window 20 is shown on the touchscreen. The window 20 contains a plurality of objects 22, each of which corresponds to a respective one of the objects 11 overlapped by the tip of the user's finger 1, and a cursor extension 21, which may be moved to select one of the objects 22.

Figure 3:
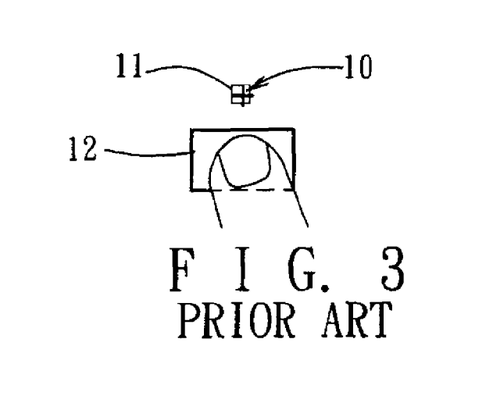
FIG. 3 is a schematic diagram illustrating a state wherein a cursor extension and a tip of a user's finger respectively and simultaneously overlap a pair of objects displayed on a touchscreen.

The two conventional object-selecting techniques are disadvantageous in that the cursor extension 10, 21 has to overlap the object 11, 21 being selected. Moreover, after selection of the object 11, 21, the conventional object-selecting techniques require the user to lift his/her finger 1 off the touchscreen prior to selection of another object 11, 21. Further, with these conventional object-selecting techniques, selection of an object 11, 21 near an edge of the touchscreen is inconvenient. In addition, in the first object-selecting technique, as illustrated in FIG. 3, when the cursor extension 10 overlaps the object 11 and the tip of the user's finger 1 overlaps another object 12 displayed on the touchscreen simultaneously, the object 11 can be mistaken for the object 12.

SUMMARY OF THE INVENTION

Therefore, the object of the present invention is to provide an object-selecting method that can overcome the aforesaid drawbacks of the prior art.

According to a first aspect of the present invention, an object-selecting method, which uses a touchpad of an electronic apparatus, comprises:

A) detecting presence of a touch spot on the touchpad of the electronic apparatus;

B) determining a set of objects adjacent to a position associated with the touch spot detected in step A); and C) when it is determined that the position associated with the touch spot moves toward one of the objects determined in step B), selecting said one of the objects.

According to a second aspect of the present invention, an object-selecting method, which uses a touchpad of an electronic apparatus that further includes a screen, comprises:

A) displaying a set of objects on the screen of the electronic apparatus;

B) when it is determined that a position on the screen associated with a touch spot on the touchpad overlaps one of the objects displayed in step A), showing the object overlapped by the position on the screen associated with the touch spot and other ones of the objects displayed in step A) and adjacent to the object overlapped by the position on the screen associated with the touch spot in a prominent manner; and C) when it is determined that the position on the screen associated with the touch spot moves toward one of the objects shown in the prominent manner in step B), selecting said one of the objects.

According to a third aspect of the present invention, an object-selecting method, which uses a touchpad of an electronic apparatus that further includes a screen, comprises:

A) detecting presence of a touch spot on the touchpad of the electronic apparatus;

B) when there is no object displayed on the screen adjacent to a position on the screen associated with the touch spot detected in step A), displaying a set of objects adjacent to the position on the screen associated with the touch spot; and C) when it is determined that the position on the screen associated with the touch spot moves toward one of the objects displayed in step B), selecting said one of the objects.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 4:
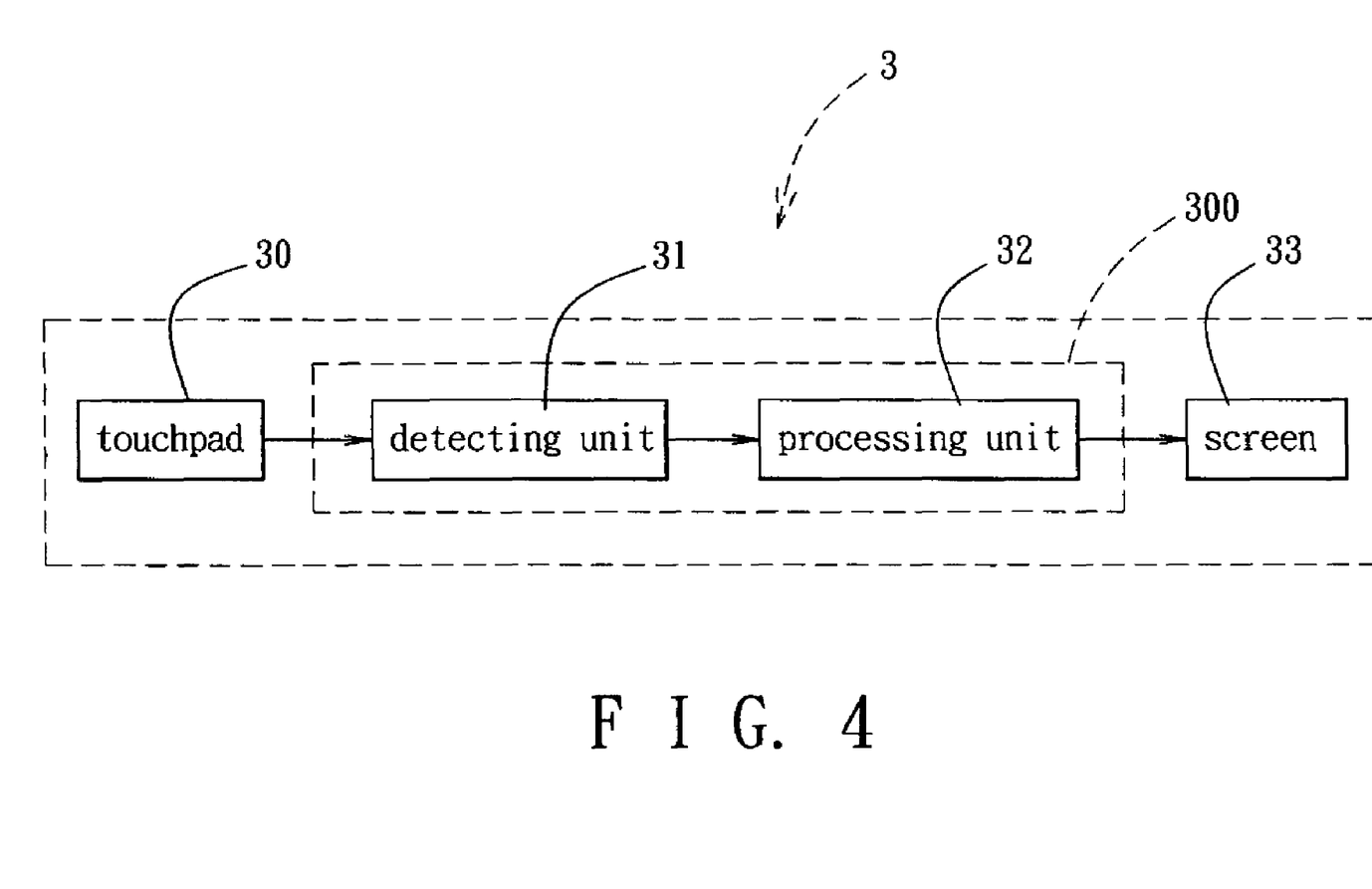
FIG. 4 is a schematic block diagram of an electronic apparatus that incorporates the preferred embodiment of an object-selecting device according to this invention.

Referring to FIG. 4, the preferred embodiment of an object-selecting device 300 according to this invention is shown to include a detecting unit 31 and a processing unit 32.

The object-selecting device 300 of this invention is applied to an electronic apparatus 3 that includes a screen 33 and a touchpad 30, such as a notebook computer, a personal digital assistant (PDA), a mobile phone, or a navigating apparatus.

The touchpad 30 is operable so as to obtain a position associated with a touch spot (not shown) impressed by a tip of a user's finger (not shown) on the touchpad 30, in a manner well known in the art. In this embodiment, the touchpad 30 may be a planar or a non-planar capacitive touchpad. Moreover, in this embodiment, the touchpad 30 is mounted on the screen 33. That is, the touchpad 30 and the screen 33 constitute a touchscreen, whereby the position associated with the touch spot is a position on the screen 33.

The detecting unit 31 includes a touch controller circuit (not shown) and is connected to the touchpad 30 of the electronic apparatus 3.

The processing unit 32 includes a microprocessor (not shown) and is connected to the detecting unit 31 and the screen 33 of the electronic apparatus 3.

Figure 5:
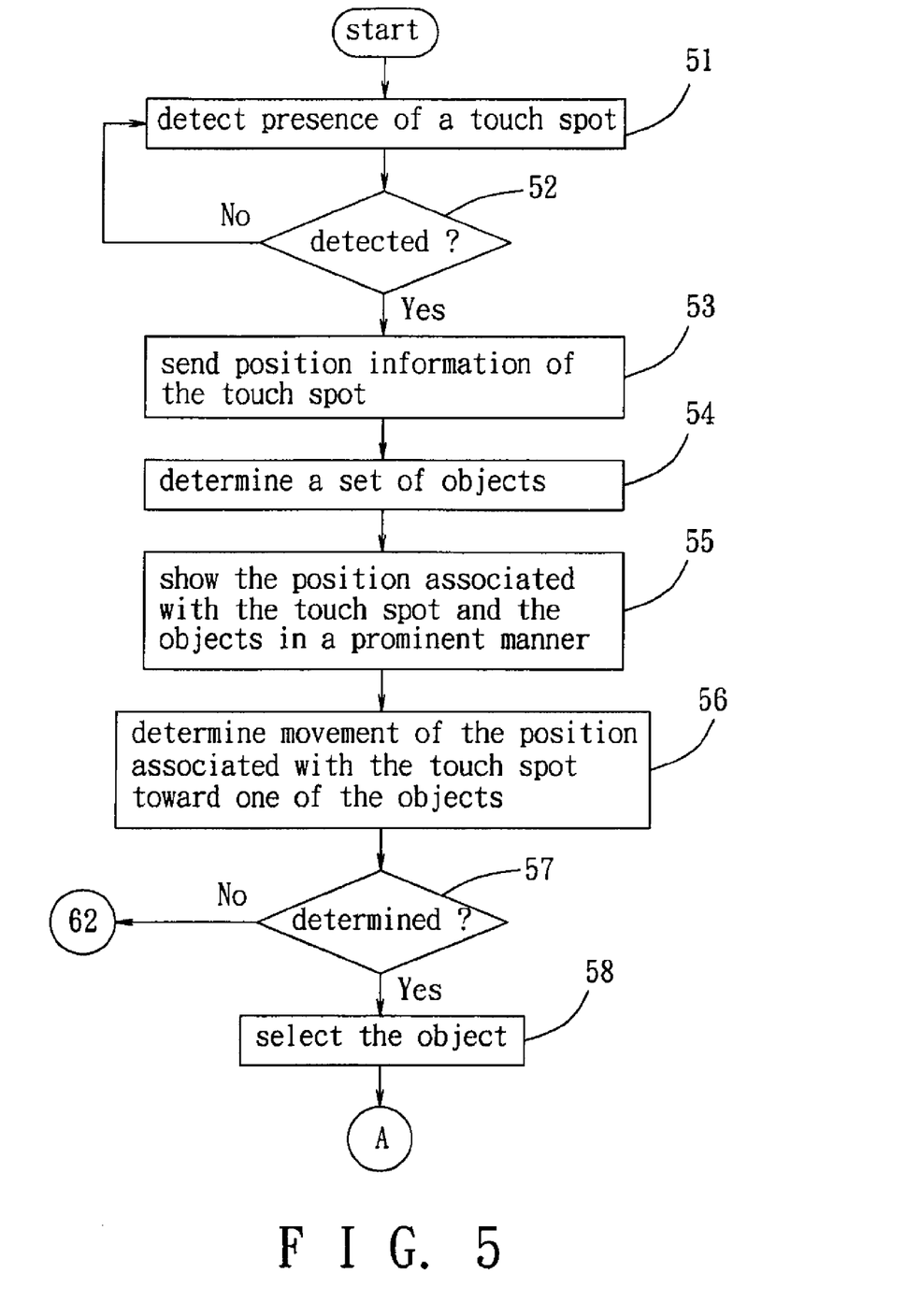
FIGS. 5 and 6 are flowcharts of the first preferred embodiment of an object-selecting method to be implemented using the object-selecting device shown in FIG. 4 according to this invention.
Figure 6:
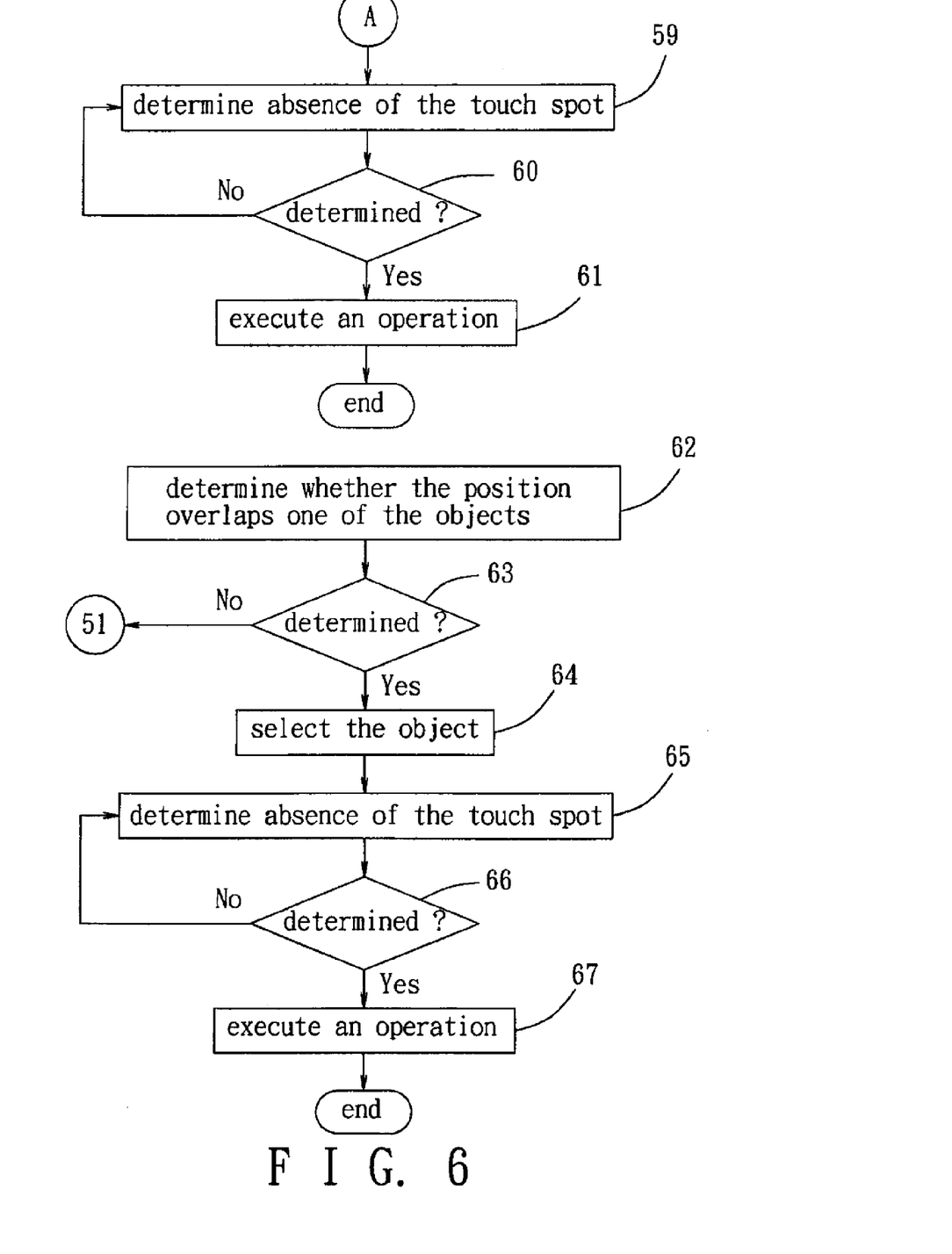

The first preferred embodiment of an object-selecting method to be implemented using the aforementioned object-selecting device 300 according to this invention will now be described with further reference to FIGS. 5 and 6.

Figure 7:
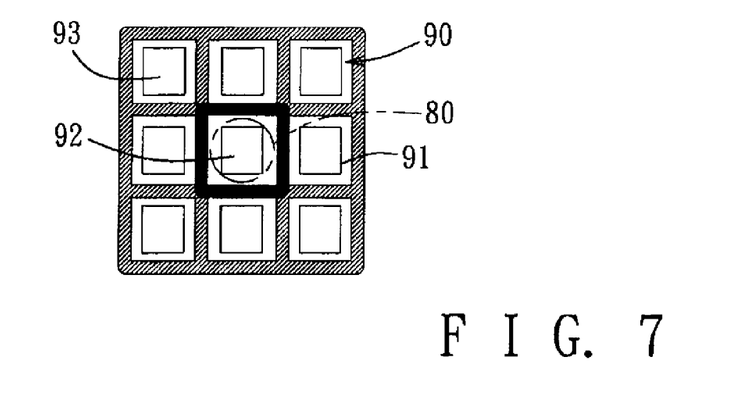
FIGS. 7 to 9 are schematic diagrams illustrating a state wherein an object is overlapped by a position on a screen associated with a touch spot.

In step 51, with further reference to FIG. 7, the detecting unit 31 detects presence of a touch spot 80 on the touchpad 30 of the electronic apparatus 3.

In step 52, when the presence of the touch spot 80 is detected in step 51, the flow proceeds to step 53. Otherwise, the flow goes back to step 51.

In step 53, the detecting unit 31 sends position information, i.e., coordinates, associated with the touch spot 80 detected thereby in step 51 to the processing unit 32.

In step 54, the processing unit 32 determines a set of objects, e.g., the objects 90, displayed on the screen 33 and adjacent to the position associated with the touch spot 80 sent thereto in step 53.

In this step, each of the objects 90 is determined based on coordinates thereof stored in a database (not shown) of the electronic apparatus 3.

In step 55, the processing unit 32 shows on the screen 33 the position associated with the touch spot 80 and the adjacent objects 90 determined in step 54 in a prominent manner.

In this step, the position associated with the touch spot 80 may be enclosed within a thick frame, while the adjacent objects 90 maybe enclosed within a thick frame, made brighter, or highlighted, i.e., placed into the foreground.

In step 56, the processing unit 32 determines movement of the position associated with the touch spot 80 toward one of the objects 90, e.g., the object 91, shown in the prominent manner in step 55.

In this step, the movement of the position associated with the touch spot 80 toward the object 91 is determined when the processing unit 32 detects a track of the position associated with the touch spot 80 within a predetermined time duration, such as 500 millisecond. That is, in this step, the movement of the position associated with the touch spot 80 toward the object 91 is determined when the position associated with the touch spot 80 changes from an initial position, e.g., (x1, y1), to a final position, e.g., (x2, y2), within the predetermined time duration, and when an absolute value of the difference either between x2 and x1 or y2 and y1 is greater than a predetermined value, e.g., zero. Moreover, in this step, the object 91 toward which the position associated with the touch spot 80 moves is determined by transforming a vector from the initial position, i.e., (x1, y1), to the final position, i.e., (x2, y2), into polar coordinates. Further, in this step, when the absolute value of the difference between x2 and x1 or y2 and y1 is greater than a specified value, e.g., one centimeter, the object 91 toward which the position associated with the touch spot 80 moves may be determined immediately without first transforming the vector from the initial position to the final position into polar coordinates.

It is noted that the position associated with the touch spot 80 may be moved by rolling or sliding the tip of the user's finger on the touchpad 30.

In step 57, when it is determined in step 56 that the position associated with the touch spot 80 moves toward the object 91, the flow proceeds to step 58. Otherwise, the flow proceeds to step 62.

In step 58, the processing unit 32 selects the object 91.

In step 59, the processing unit 32 determines absence of the touch spot 80 from the touchpad 30.

In this step, the absence of the touch spot 80 from the touchpad 30 is determined based on a detection result from the detecting unit 31.

In step 60, when the absence of the touch spot 80 from the touchpad 30 is determined in step 59, the flow proceeds to step 61. Otherwise, the flow goes back to step 59.

In step 61, the electronic apparatus 3 executes an operation associated with the object 91 selected in step 58. Thereafter, the flow is terminated.

In step 62, the processing unit 32 determines whether the position associated with the touch spot 80 overlaps one of the objects 90, e.g., the object 92, shown in the prominent manner in step 55.

In step 63, when it is determined in step 62 that the position associated with the touch spot 80 overlaps the object 92, the flow proceeds to step 64. Otherwise, the flow goes back to step 51.

In step 64, the processing unit 32 selects the object 92.

In step 65, the processing unit 32 determines absence of the touch spot 80 from the touchpad 30.

In step 66, when the absence of the touch spot 80 from the touchpad 30 is determined in step 65, the flow proceeds to step 67. Otherwise, the flow goes back to step 65.

In step 67, the electronic apparatus 3 executes an operation associated with the object 92 selected in step 64. Thereafter, the flow is terminated.

Figure 8:
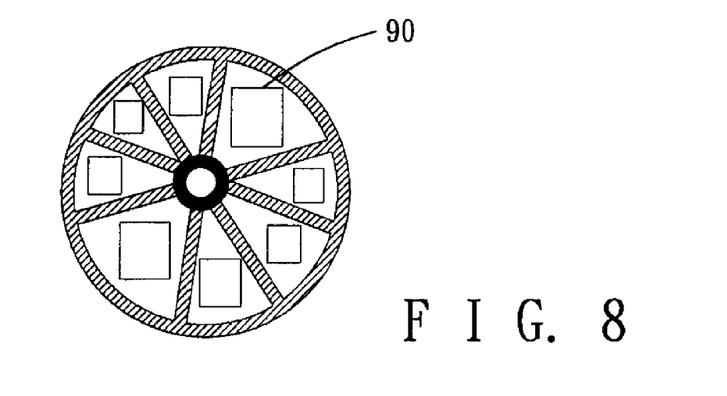
Figure 9:
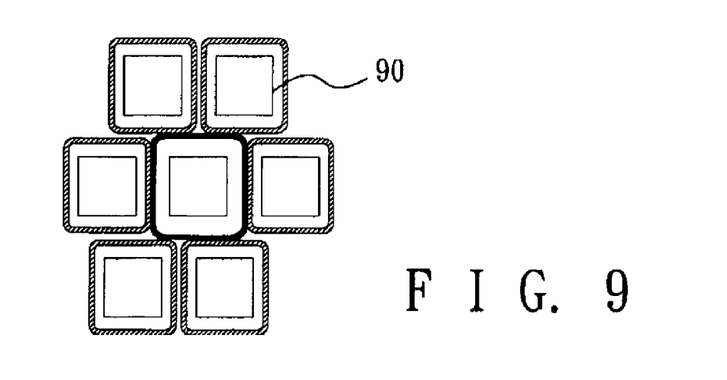

In this embodiment, the object-selecting method further includes the following steps:

68) the electronic apparatus 3 executes the operation associated with the object 91 selected in step 58 when the touch spot 80 remains on the touchpad 30 beyond a second predetermined time duration after step 58;

69) the electronic apparatus 3 executes the operation associated with the object 92 selected in step 64 when the touch spot 80 remains on the touchpad 30 beyond the predetermined time duration after step 64;

As such, after steps 68 or 69, when it is desired to select another one of the objects 90 shown in the prominent manner in step 55, e.g. the object 93, the position associated with the touch spot 80 may be moved toward the object 93 immediately without requiring lifting the user's finger off the touchpad 30;

70) when the processing unit 32 determines that there is no object displayed on the screen 33 adjacent to the position associated with the touch spot 80, the processing unit 32 displays on the screen 33 a set of objects, i.e., the objects 90, adjacent to the position associated with the touch spot 80:

In this step, the objects 90 are displayed on the screen 33 such that the objects 90 are arranged in an array of rows and columns, as best shown in FIG. 7. In an alternative embodiment, the objects 90 may be displayed such that the objects 90 are arranged in a hexagonal pattern that resembles a honeycomb, as best shown in FIG. 9, or such that the objects 90 are angularly spaced apart from each other, as best shown in FIG. 8; and 71) when the processing unit 32 determines that the position associated with the touch spot 80 overlaps one of the objects 90, e.g., the object 92, displayed on the screen 33 and that there is not another object displayed on the screen 33 and adjacent to the object 92 overlapped by the position associated with the touch spot 80, the processing unit 32 displays on the screen 33 a set of other objects, e.g., the objects 90, adjacent to the position associated with the touch spot 80:

In this step, the object 92 overlapped by the position associated with the touch spot 80 may be a multimedia player computer icon, and the objects 90 subsequently displayed adjacent to the position associated with the touch spot 80 are multimedia player buttons, such as play, stop, pause, forward, and reverse buttons.

In an alternative embodiment, the touchpad 30 of the electronic apparatus 3 is an optical touchpad 30, and includes a charged-coupled device (CCD) (not shown) that captures images of a touch spot 80 on the touchpad 30. In this case, the detecting unit 31 detects the images captured by the CCD of the touchpad 30, and sends the images detected thereby to the processing unit 32. The processing unit 32 determines movement of a position associated with the touch spot 80 toward one of the objects 90 based on the images, such as based on shapes and sizes of the captured images of the touch spot 80, sent thereto by the detecting unit 31 within the predetermined time duration, selects the object 90 toward which the position associated with the touch spot 80 moves, and subsequently enables the electronic apparatus 3 to execute an operation associated with the object 90 selected thereby when absence of the touch spot 80 from the touchpad 30 is determined by the processing unit 32.

In yet another embodiment, the touchpad 30 and the screen 33 are separated from each other. Each of the objects 90 is provided on the touchpad 30 of the electronic apparatus 3. In this case, the detecting unit 31 detects presence of the touch spot 80 on the touchpad 30, and sends a detected position of the touch spot 80 on the touchpad 30 to the processing unit 32. The processing unit 32 determines movement of the position of the touch spot 80 on the touchpad 30 toward one of the objects 90 within the predetermined time duration, selects the object 90 toward which the position of the touch spot 80 on the touchpad 30 moves, and subsequently enables the electronic apparatus 3 to execute an operation associated with the object 90 selected thereby when absence of the touch spot 80 from the touchpad 30 is determined by the processing unit 32.

From the above description, when it is desired to select one of the objects 90 displayed on the screen 33 of the electronic apparatus 3 (or provided on the touchpad 30 of the electronic apparatus 3) and adjacent to a position on the screen 33 (or the touchpad 30) associated with the touch spot 80, the user may simply roll or slide his/her finger on the touchpad 30 such that the position on the screen 33 (or the touchpad 30) associated with the touch spot 80 moves toward one of the objects 90. Hence, selection of the objects 90, even those that are near an edge of the screen 33 (or the touchpad 30), is relatively fast and convenient.

Figure 10:
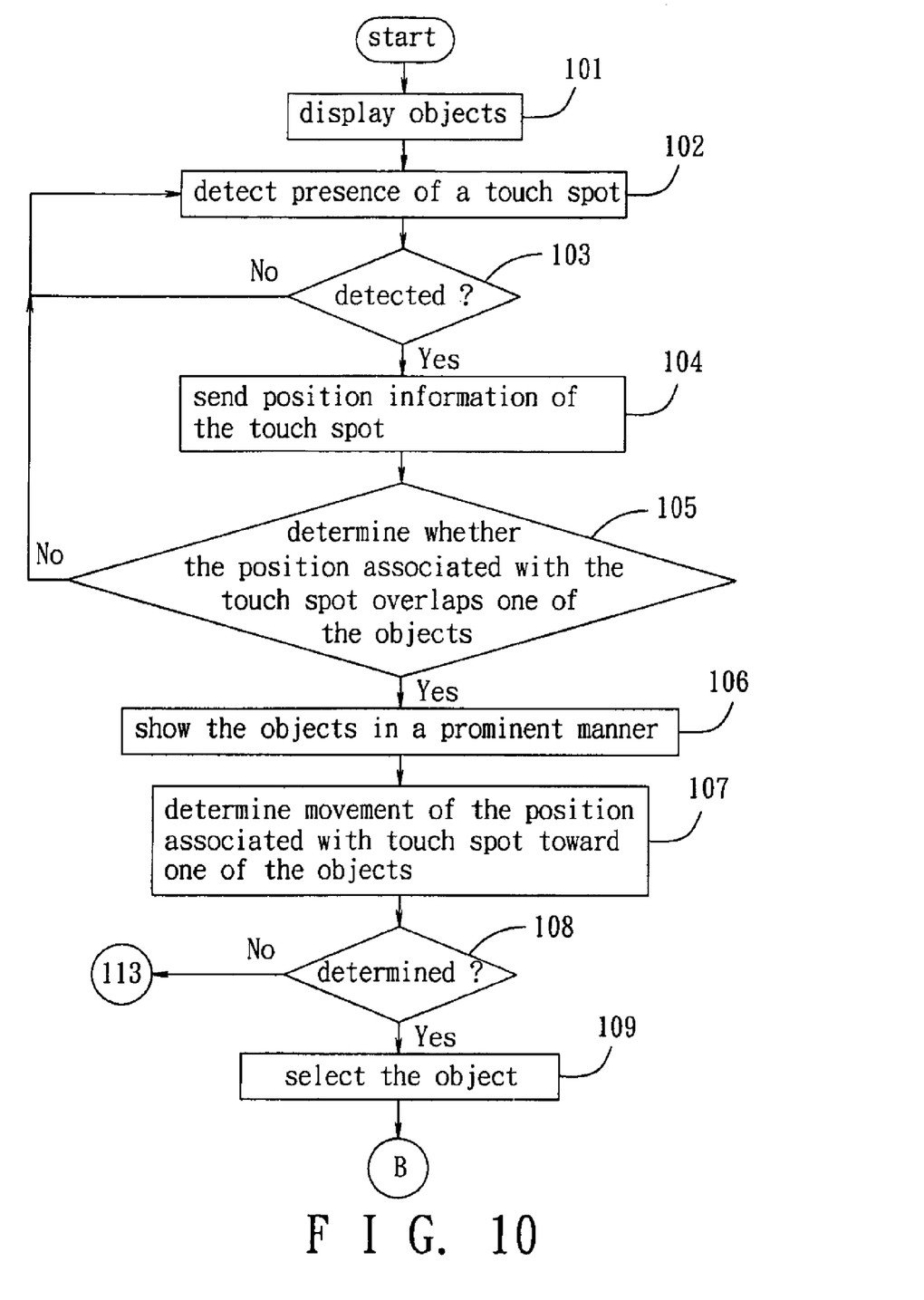
FIGS. 10 and 11 are flowcharts of the second preferred embodiment of an object-selecting method to be implemented using the object-selecting device shown in FIG. 4 according to this invention.
Figure 11:
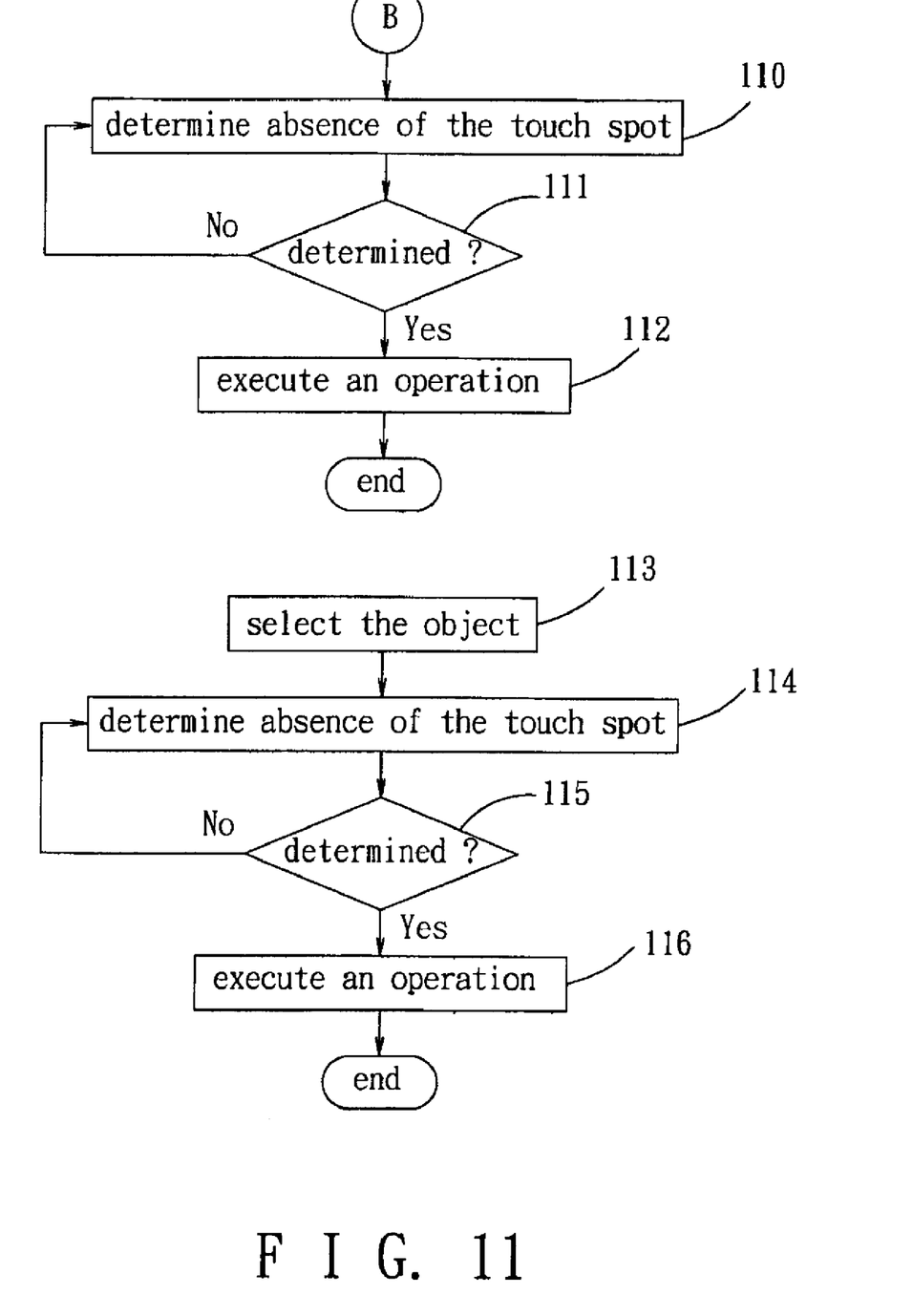

The second preferred embodiment of an object-selecting method to be implemented using the aforementioned object-selecting device 300 according to this invention will now be described with further reference to FIGS. 10 and 11.

Figure 12:
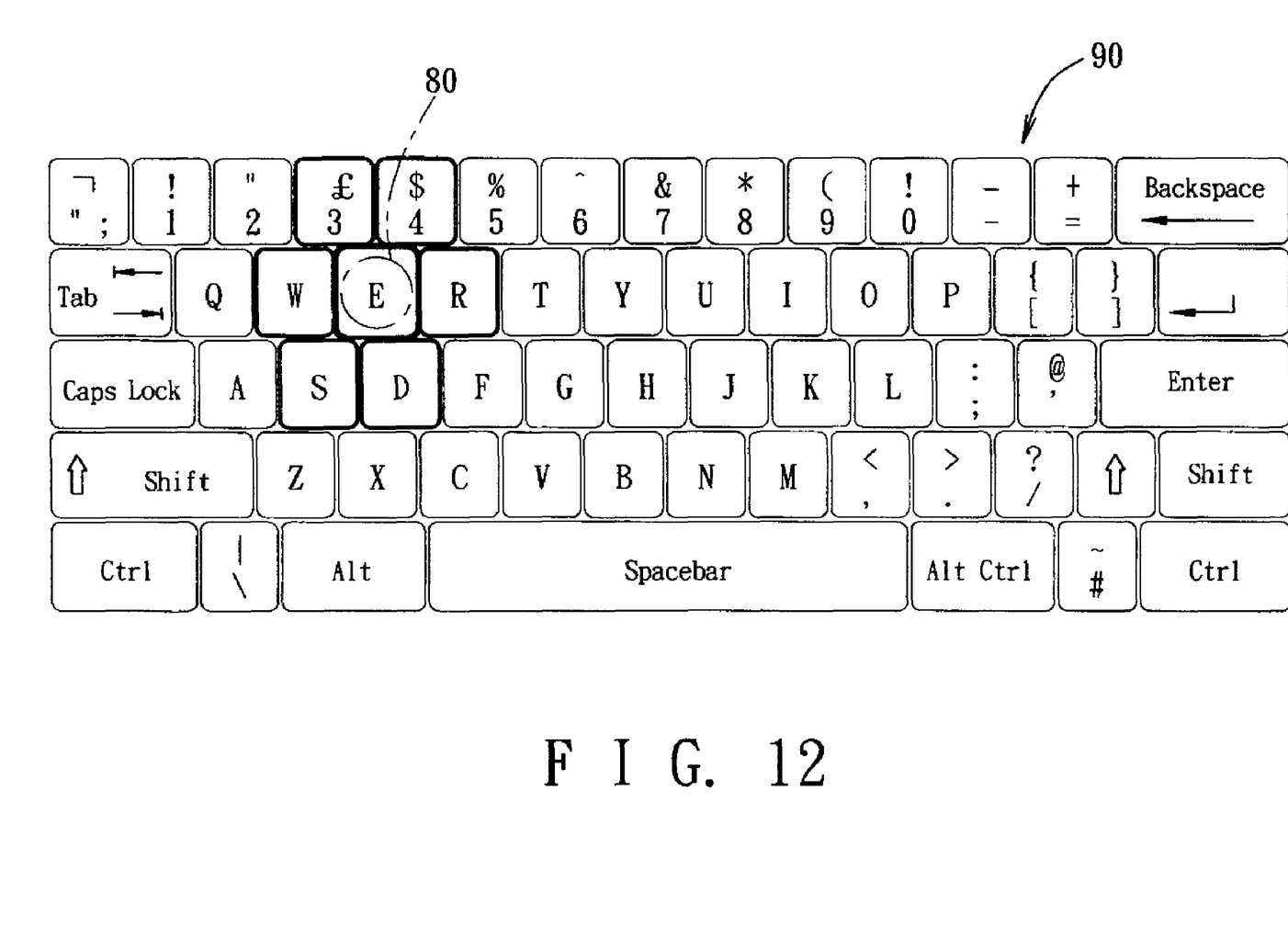
FIG. 12 is a schematic diagram illustrating a state wherein a key of a virtual keyboard is overlapped by a position on a screen associated with a touch spot.

In step 101, with further reference to FIG. 12, the processing unit 32 displays a plurality of objects 90, e.g., keys of a virtual keyboard, on the screen 33 of the electronic apparatus 3.

In step 102, the detecting unit 31 detects presence of a touch spot 80 on the touchpad 30 of the electronic apparatus 3.

In step 103, when the presence of the touch spot 80 is detected in step 102, the flow proceeds to step 104. Otherwise, the flow goes back to step 102.

In step 104, the detecting unit 31 sends position information associated with the touch spot 80 detected thereby in step 102 to the processing unit 32.

In step 105, when the processing unit 32 determines that the position on the screen 33 associated with the position information of the touch spot 80 sent thereto in step 104 overlaps one of the objects 90, e.g., the key "E", displayed in step 101, the flow proceeds to step 106. Otherwise, the flow goes back 102.

In step 106, the processing unit 32 shows on the screen 33 the object 90, i.e., the key "E", overlapped by the position on the screen 33 associated with the touch spot 80 and other ones of the objects 90, e.g., the keys "3", "4", "W", "R", "S", "D", displayed in step 101 and adjacent to the object 90, i.e., the key "E", overlapped by the position on the screen 33 associated with the touch spot 80 in a prominent manner.

In this step, an object is determined to be adjacent to an object overlapped by the position on the screen 33 associated with the touch spot 80 when the object is within a predetermined range, e.g., two millimeters or fifty pixels, of the object overlapped by the position on the screen 33 associated with the touch spot 80.

In step 107, the processing unit 32 determines movement of the position on the screen 33 associated with the touch spot 80 toward one of the objects 90, e.g., the key "D", shown in the prominent manner in step 106. In this step, the movement of the position on the screen 33 associated with the touch spot 80 is determined within the predetermined time duration.

In step 108, when it is determined in step 107 that the position on the screen 33 associated with the touch spot 80 moves toward the object 90, i.e., the key "D", the flow proceeds to step 109. Otherwise, the flow proceeds to step 113.

In step 109, the processing unit 32 selects the object 90, i.e., the key "D", toward which the position on the screen 33 associated with the touch spot 80 moves.

In step 110, the processing unit 32 determines absence of the touch spot 80 from the touchpad 30.

In step 111, when the absence of the touch spot 80 from the touchpad 30 is determined in step 110, the flow proceeds to step 112. Otherwise, the flow goes back to step 110.

In step 112, the electronic apparatus 3 executes an operation associated with the object 90 selected in step 109, e.g., input the capital letter "D". Thereafter, the flow is terminated.

In step 113, the processing unit 32 selects the object 90, i.e., the key "E", shown in the prominent manner in step 106 and overlapped by the position on the screen 33 associated with the touch spot 80.

In step 114, the processing unit 32 determines absence of the touch spot 80 from the touchpad 30.

In step 115, when the absence of the touch spot 80 from the touchpad 30 is determined in step 114, the flow proceeds to step 116. Otherwise, the flow goes back to step 114.

In step 116, the electronic apparatus 3 executes an operation associated with the object selected in step 113, e.g., input the capital letter "E". Thereafter, the flow is terminated.

Figure 13:
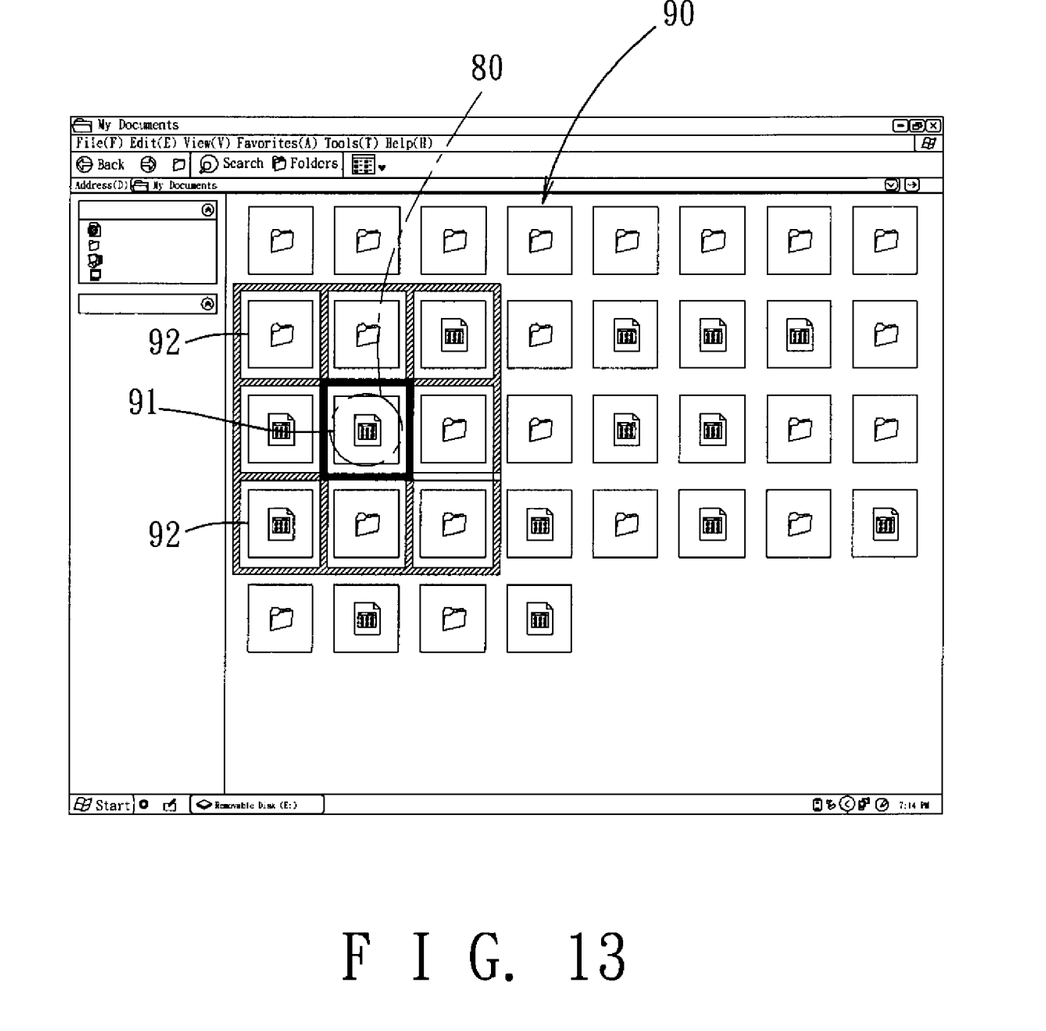
FIG. 13 is a schematic diagram illustrating a state wherein a computer icon is overlapped by a position on a screen associated with a touch spot.

As another example of an application of the object-selecting method of this embodiment, with further reference to FIG. 13, instead of the keys of the virtual keyboard, the objects 90 displayed on the screen 33 in step 101 are computer icons. In this case, when the processing unit 32 determines in step 105 that the position on the screen 33 associated with the touch spot 80 detected in step 102 by the detecting unit 31 overlaps one of the objects 90, e.g., the computer icon 91, the processing unit 32 shows the object 90, i.e., the computer icon 91, overlapped by the position on the screen 33 associated with the touch spot 80, and other ones of the objects 90, i.e., the computer icons 92, displayed in step 101 and adjacent to the object 90 overlapped by the position on the screen 33 associated with the touch spot 60 in a prominent manner, determines movement of the position on the screen 33 associated with the touch spot 80 toward one of the objects 90, e.g., the computer icon 92, shown in the prominent manner in step 106 within the predetermined time duration, selects the object 90 toward which the position on the screen 33 associated with the touch spot 80 moves, and subsequently enables the electronic apparatus 3 to execute an operation associated with the object 90 selected thereby when absence of the touch spot 80 from the touchpad 30 is determined by the processing unit 32. On the other hand, when the processing unit 32 does not determine the movement of the position on the screen 33 associated with the touch spot 80 within the predetermined time duration, the processing unit 32 selects the object 90, i.e., the computer icon 91, and subsequently enables the electronic apparatus 3 to execute an operation associated with the object 90 selected thereby when absence of the touch spot 80 from the touchpad 30 is determined by the processing unit 32.

In another example, when the objects 90 are displayed in step 101 such that the objects 90 are angularly spaced apart from each other, as best shown in FIG. 8, each of the objects 90 is enclosed within a thick frame. Moreover, when the selected object 90 is the object 90 at the right of the object 90 overlapped by the position on the screen 33 associated with the touch spot 80, the operation executed by the electronic apparatus 3 may result in the increase of a volume level. On the other hand, when the selected object 90 is the object 90 at the left of the object 90 overlapped by the position on the screen 33 associated with the touch spot 80, the operation executed by the electronic apparatus 3 may result in the decrease of a volume level.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An object-selecting method using a touchpad of an electronic apparatus, comprising:
    A) detecting presence of a touch spot on the touchpad of the electronic apparatus;
    B) determining a set of objects adjacent to a position associated with the touch spot detected in step A); and
    C) when it is determined that the position associated with the touch spot moves toward one of the objects determined in step B), selecting said one of the objects.

2. The object-selecting method as claimed in claim 1, further comprising showing the objects determined in step B) in a prominent manner.

3. The object-selecting method as claimed in claim 1, further comprising executing an operation associated with the object selected in step C) when absence of the touch spot from the touchpad is determined after step C).

4. The object-selecting method as claimed in claim 1, further comprising executing an operation associated with the object selected in step C) when the touch spot remains on the touchpad beyond a predetermined time duration after step C).

5. The object-selecting method as claimed in claim 1, wherein, in step C), the movement of the position associated with the touch spot is determined within a predetermined time duration.

6. The object-selecting method as claimed in claim 5, further comprising:
    D) when the movement of the position associated with the touch spot is not determined within the predetermined time duration in step C), selecting an object overlapped by the position associated with the touch spot.

7. The object-selecting method as claimed in claim 6, further comprising:
    E) executing an operation associated with the object selected in step D).

8. The object-selecting method as claimed in claim 1, wherein, in step C), the movement of the position associated with the touch spot is determined when a track of the position associated with the touch spot is determined within a predetermined time duration.

9. An object-selecting method using a touchpad of an electronic apparatus, the electronic apparatus further including a screen, said object-selecting method comprising:
    A) displaying a set of objects on the screen of the electronic apparatus;
    B) when it is determined that a position on the screen associated with a touch spot on the touchpad overlaps one of the objects displayed in step A), showing the object overlapped by the position on the screen associated with the touch spot and other ones of the objects displayed in step A) and adjacent to the object overlapped by the position on the screen associated with the touch spot in a prominent manner; and
    C) when it is determined that the position on the screen associated with the touch spot moves toward one of the objects shown in the prominent manner in step B), selecting said one of the objects.

10. The object-selecting method as claimed in claim 9, wherein, in step C), the movement of the position on the screen associated with the touch spot is determined within a predetermined time duration.

11. An object-selecting method using a touchpad of an electronic apparatus, the electronic apparatus further including a screen, said object-selecting method comprising:
    A) detecting presence of a touch spot on the touchpad of the electronic apparatus;
    B) when there is no object displayed on the screen adjacent to a position on the screen associated with the touch spot detected in step A), displaying a set of objects adjacent to the position on the screen associated with the touch spot; and
    C) when it is determined that the position on the screen associated with the touch spot moves toward one of the objects displayed in step B), selecting said one of the objects.

* * * * *